United States Patent
Venkataramappa et al.

(10) Patent No.: US 7,363,487 B2
(45) Date of Patent: *Apr. 22, 2008

(54) METHOD AND SYSTEM FOR DYNAMIC CLIENT AUTHENTICATION IN SUPPORT OF JAAS PROGRAMMING MODEL

(75) Inventors: Vishwanath Venkataramappa, Austin, TX (US); Shyamala Vishwanath, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 794 days.

This patent is subject to a terminal disclaimer.

(21) Appl. No.: 10/611,022

(22) Filed: Jul. 1, 2003

(65) Prior Publication Data

US 2005/0005090 A1    Jan. 6, 2005

(51) Int. Cl.
    *H04L 9/00*    (2006.01)
(52) U.S. Cl. .................................... 713/150
(58) Field of Classification Search ............... 713/168, 713/150; 726/8
    See application file for complete search history.

(56) References Cited

U.S. PATENT DOCUMENTS

| | | | |
|---|---|---|---|
| 6,189,103 B1* | 2/2001 | Nevarez et al. | 726/5 |
| 6,301,661 B1* | 10/2001 | Shambroom | 713/168 |
| 6,615,350 B1* | 9/2003 | Schell et al. | 713/168 |
| 6,751,677 B1* | 6/2004 | Ilnicki et al. | 719/316 |
| 6,775,783 B1* | 8/2004 | Trostle | 726/6 |
| 7,017,051 B2* | 3/2006 | Patrick | 726/12 |
| 7,174,569 B1* | 2/2007 | Trostle | 726/30 |
| 2002/0145924 A1* | 10/2002 | Beckwith | 365/200 |
| 2002/0188869 A1* | 12/2002 | Patrick | 713/201 |
| 2003/0084288 A1* | 5/2003 | de Jong et al. | 713/168 |
| 2003/0097574 A1* | 5/2003 | Upton | 713/183 |
| 2003/0212904 A1* | 11/2003 | Randle et al. | 713/200 |
| 2003/0220990 A1* | 11/2003 | Narayanan et al. | 709/220 |
| 2004/0059940 A1* | 3/2004 | Birk et al. | 713/201 |
| 2004/0088587 A1* | 5/2004 | Ramaswamy et al. | 713/202 |
| 2004/0098614 A1* | 5/2004 | Chang et al. | 713/201 |
| 2004/0123138 A1* | 6/2004 | Le Saint | 713/201 |
| 2004/0123152 A1* | 6/2004 | Le Saint | 713/201 |
| 2004/0168084 A1* | 8/2004 | Owen et al. | 713/201 |

OTHER PUBLICATIONS

BEA, BEA Weblogic Server, release 7.0, Mar. 28, 2003, BEA Systems, pp. 1-3, chapter 4, pp. 4-1 to 4-24.*

* cited by examiner

*Primary Examiner*—Nasser Moazzami
*Assistant Examiner*—David Garcia Cervetti
(74) *Attorney, Agent, or Firm*—Hamilton & Terrile, LLP

(57) ABSTRACT

Authentication operations are performed within a CORBA-compliant environment with client applications using the JAAS programming model. A client application obtains an interoperable object reference (IOR) for a target object on a remote server that is protected within a security domain. After the client application invokes the target object, an object request is generated, and a request-level interceptor obtains the IOR for the target object and extracts an identifier for the security domain from the IOR. If a credential for the security domain is not in the current execution context of the client application, i.e., the current JAAS subject in the JAAS programming model, then the request-level interceptor performs an authentication operation with the security domain on behalf of the client application, receives an authentication credential, and places the authentication credential into the execution context of the client application. The object request is further processed in association with the obtained credential.

18 Claims, 3 Drawing Sheets

METHOD AND SYSTEM FOR DYNAMIC CLIENT AUTHENTICATION IN SUPPORT OF JAAS PROGRAMMING MODEL

BACKGROUND OF THE INVENTION

1. Field of the Invention

The present invention relates to an improved data processing system and, in particular, to a method and apparatus for multicomputer data transferring. Still more particularly, the present invention provides a method and apparatus for computer-to-computer authentication.

2. Description of Related Art

In a distributed data processing environment that comprises multiple security domains, a client within one security domain may need to communicate with servers within multiple security domains, each of which requires the successful completion of an authentication operation that is valid only within a particular security domain. Moreover, each of the security domains may employ different types of authentication procedures, all of which complicates the development of applications that operate in such environments.

In order to standardize security operations and minimize effort in developing Java applications, programmers may develop Java applications in accordance with the Java Authentication and Authorization Service (JAAS) programming model, which simplifies application development by serving as a building block for developers. The JAAS programming model enables developers to authenticate users and enforce access controls upon those users within these applications. By abstracting underlying authentication and authorization mechanisms and standardizing interfaces, the JAAS programming model minimizes the risk of creating security vulnerabilities within application code.

Although the JAAS programming model simplifies some aspects of incorporating authentication operations into the development of an application, the JAAS programming model contains an inherent disadvantage as follows. Before attempting to access any objects that are supported by servers within a given security domain, a client application must complete an authentication operation with respect to that given security domain. In response to completing an authentication operation, a credential for the security domain is stored within an object of Class "Subject" that is returned to the client application, which then uses the credential within a particular block of code that accesses objects that are supported within the security domain. This particular block of code is enclosed within a "doAs" operation within the "Subject" class. For example, the following programming statement, "Subject.doAs(subjectZ){block of code}", associates the provided block of code with a particular instance of a "subject" object, which in this example is "subjectZ", ostensibly a "subject" object of Class "Subject" that was returned by an authentication operation. With this exemplary operation, the Class "Subject" and other aspects of the JAAS programming model use the previously obtained credentials within the "subject" object when making any remote invocations of objects.

If the associated block of code tries to access servers in various security domains, and object of Class "Subject" does not contain all of the required credentials for these security domains, then the attempted operations will fail. Hence, the client application is required to perform any necessary authentication operations and update the object of Class "Subject" prior to accessing any objects in these security domains. However, prior to executing the associated block of code, the client application may not have the identities of the security domains of the servers with which it will attempt to communicate, i.e., the security domains of the objects within the particular block of code.

Therefore, it would be advantageous to have a method for performing timely authentication operations just prior to accessing objects within different security domains. It would be particularly advantageous to have a method for timely authentication operations that extended functionality within a pre-existing standard infrastructure or within a standard programming model for accomplishing these operations in a manner that is transparent to the client application and, therefore, not burdensome to an application developer.

SUMMARY OF THE INVENTION

A method is presented for performing an authentication operation within a CORBA-compliant (Common Object Request Broker Architecture) environment with client applications using the JAAS (Java Authentication and Authorization Service) programming model. A client application obtains an interoperable object reference (IOR) for a target object that is hosted on a remote server and that is protected within a security domain. After the client application invokes the target object, an object request is generated for the target object, and a request-level interceptor obtains the IOR for the target object and extracts an identifier for the security domain from the IOR. If the client application does not have an authentication credential for the security domain in the current execution context, i.e., the execution context in the JAAS programming model being the current JAAS subject, then the request-level interceptor performs an authentication operation with the security domain on behalf of the client application, receives an authentication credential, and places the authentication credential into the execution context of the client application. The object request is further processed in association with the obtained authentication credential.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
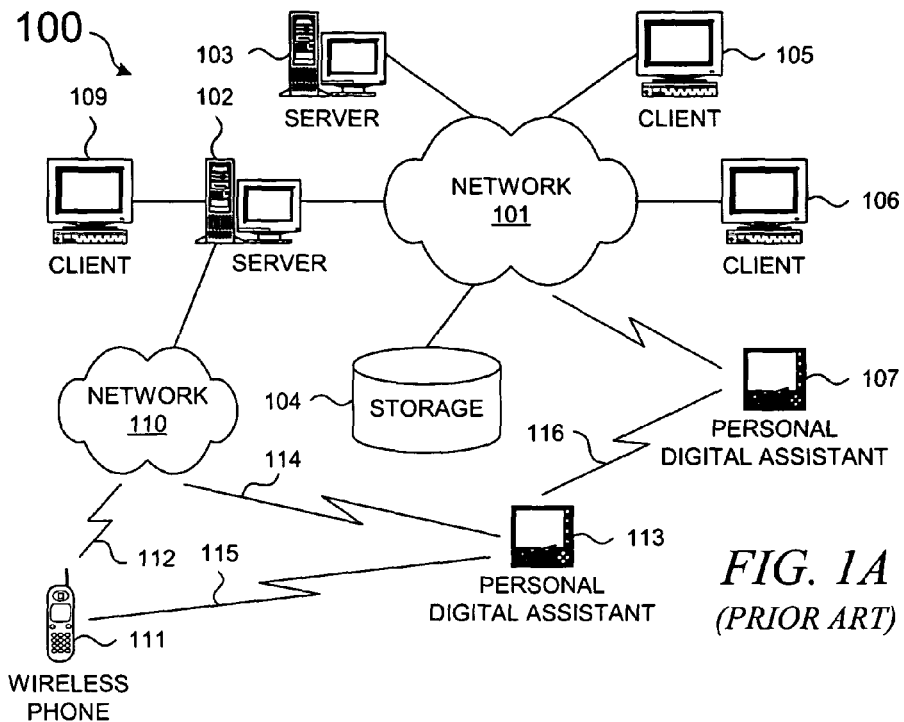
FIG. 1A depicts a typical network of data processing systems which may implement the present invention.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
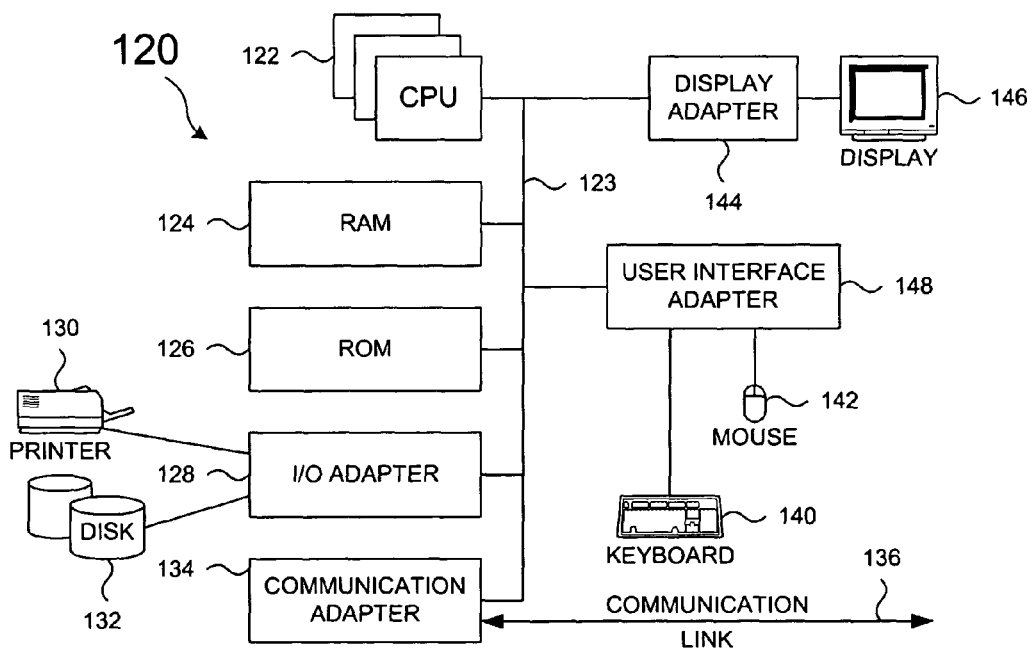
FIG. 1B depicts a typical computer architecture that may be used within a data processing system in which the present invention is implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as an audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The descriptions of the figures herein involve certain actions by either a client device or a user of the client device. One of ordinary skill in the art would understand that responses and/or requests to/from the client are sometimes initiated by a user and at other times are initiated automatically by a client, often on behalf of a user of the client. Hence, when a client or a user of a client is mentioned in the description of the figures, it should be understood that the terms "client" and "user" can be used interchangeably without significantly affecting the meaning of the described processes. In addition, the terms "subject" and "principal" can be used to represent a person, a computational device, a computational service, a client application, a server application, or a similarly identifiable entity.

The present invention may be implemented on a variety of hardware and software platforms, as described above with respect to FIG. 1A and FIG. 1B. More specifically, though, the present invention is directed to an improved infrastructure in support of Java applications that adhere to the Java Authentication and Authorization Service (JAAS) programming model. Prior to describing the improved infrastructure in more detail, a typical Java software environment is described.

Figure 1C:
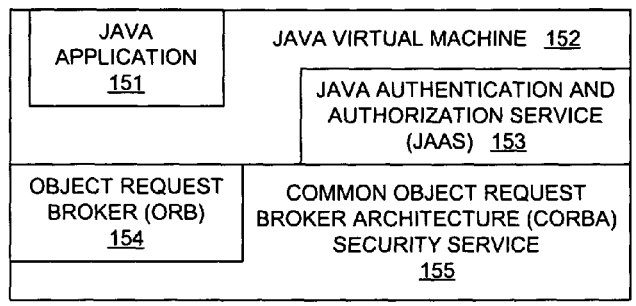
FIG. 1C depicts a block diagram that shows a logical organization of software components that may operate on a typical client device.

With reference now to FIG. 1C, a block diagram depicts a logical organization of software components that may operate on a typical client device. Java application 151 executes within a Java runtime environment, such as that provided by Java virtual machine 152, which itself may be supported within a runtime environment that is provided by another application, such as a Web browser. The Java runtime environment includes the Java Authentication and Authorization Service (JAAS) application programming interfaces (APIs) 153 that may be used by Java application 151 to incorporate security functionality. A native operating system (not shown in FIG. 1C) supports these runtime environments by providing interfaces to hardware devices and functionality for interacting with users of those devices, such as the hardware that is shown in FIG. 1B.

The Java runtime environment interfaces with object request broker (ORB) 154 that provides well-known functionality for distributed data processing environments. ORB 154 itself operates in accordance with the Common Object Request Broker Architecture (CORBA) Security Reference Model; in this example, ORB 154 is shown as interfacing with CORBA Security Service 155 to protect its interactions with other entities. The CORBA standard is managed by the Object Management Group; the CORBA standard defines a so-called "software bus" that provides interfaces between software applications that operate in an object-oriented manner within a distributed data processing environment. ORBs can be interconnected with other ORBs using inter-ORB services.

Figure 1D:
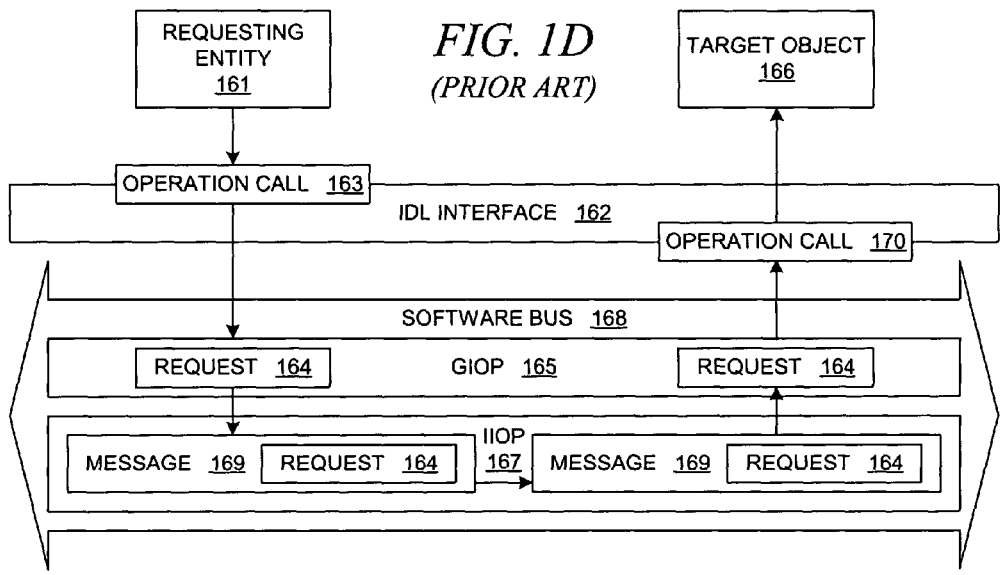
FIG. 1D depicts a block diagram that shows some of the functionality within a distributed object-oriented data processing system that is implemented in accordance with CORBA specifications.

With reference now to FIG. 1D, a block diagram depicts some of the well-known functionality within a distributed object-oriented data processing system that is implemented in accordance with the CORBA standard. An ORB, such as ORB 154 that is shown in FIG. 1C, is employed when a client application invokes an operation on a CORBA object interface; a client application, such as Java application 151 that is shown in FIG. 1, is represented more generically in FIG. 1D as requesting entity 161. An object interface is defined in the Interface Description Language (IDL) as a local interface stub, which is automatically generated by the IDL compiler for the language in which the client is written; a collection of stubs and skeletons is represented as IDL interface 162, which allows the client application developer to use the remote object as though it is written in the same language and supported as a local object.

A call to an interface stub routine asks the ORB to transform language-specific operation call 163 into a language-independent, operating-system-independent, and hardware-independent General Inter-ORB Protocol (GIOP) request, shown as request 164 within GIOP layer 165. The GIOP defines a common data representation for all of the basic IDL types and basic request formats that cover all of the kinds of interactions between the requesting entity and target object 166, including an Interoperable Object Reference (IOR) that allows the target object to publish information that allows ORBs on clients throughout the distributed data processing system to find and forward requests to it.

GIOP request 164 is then passed to a network transport processing layer, shown as the Internet Inter-ORB Protocol (IIOP) layer 167; the GIOP layer and the IIOP layer along with other CORBA components are sometimes described as software bus 168. The transport processing layer transforms the GIOP object location information into the transport-specific address (TCP host and port for IIOP) of the object implementation, i.e., target object 166, and creates transport message 169 that contains GIOP request 164. The client-side ORB sends message 169 to the ORB on which target object 166 is executing; e.g., referring again to FIG. 1A, an ORB that is executing on client 105 may send its request to an ORB that is executing on server 103. The receiving ORB's transport processing layer extracts GIOP request 164 from message 169 and forwards it to the GIOP processing layer, which transforms the request into a format that is required by target object 166. The target object's code is then invoked as operation call 170 from the interface skeleton routine generated by the IDL compiler. After the target object completes its processing, it returns control to the skeleton routine, which sends the result back to the client stub, which returns the result to the requesting entity.

Figure 1E:
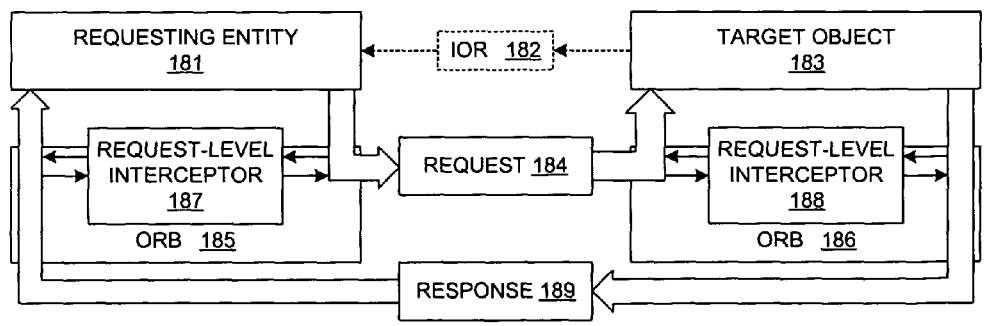
FIG. 1E depicts a block diagram that shows a typical transaction that includes operations by CORBA request-level interceptors during the transaction.

With reference now to FIG. 1E, a block diagram depicts a typical transaction that includes operations by CORBA request-level interceptors during the transaction. In a manner similar to that described above with respect to FIG. 1D, at some point in time, requesting entity 181 may use a naming or lookup service to locate a target object with which it desires to interact; after performing certain well-known functions, requesting entity 181 receives interoperable object reference (IOR) 182 that is associated with target object 183.

At a subsequent point in time, requesting entity 181 uses IOR 182 in an attempt to access target object 183, which results in the generation of request 184; a structured request contains the IOR of the target object that is being accessed. However, before ORB 185 sends request 184 to ORB 186 that supports target object 183, ORB 185 invokes request-level interceptor 187, which may process outgoing request 184 in some manner. A request-level interceptor is a programmer-provided CORBA object that provides a means to insert functionality, such as security or monitoring components, into the invocation path between the client and server components of a CORBA-compliant application. After an interceptor is installed and registered with an ORB on a particular machine, the ORB invokes the interceptor to perform its functions, usually on both outgoing and incoming data traffic.

Request-level interceptors may be implemented as client-side or server-side interceptors, and the interceptors may be invoked on incoming or outgoing requests and responses/replies, which may or may not modify a request or a response. Hence, ORB 186 may invoke request-level interceptor 188 on incoming request 184, and ORB 186 may invoke request-level interceptor 188 (or a different interceptor) on outgoing response 189. Similarly, ORB 185 may invoke request-level interceptor 187 (or a different interceptor) on incoming response 189. Although not shown in FIG. 1E, interceptors may also be implemented in a similar manner at the message level rather than the request level. An ORB transforms a request into a message that is sent over the network; message-level interceptors perform transformations on messages.

CORBA (Common Object Request Broker) security services contains a set of APIs that can be used within an application program to perform an authentication operation and then to execute a block of code in association with the authentication credentials. Authentication of principals provides the ability to ensure that only registered principals have access to the objects in the system. An authenticated principal is used as the primary mechanism to control access to objects. The act of authenticating principals allows the security model to: make principals accountable for their actions; control access to protected objects; identify the originator of a request; and identify the target of request. Table 1 shows a set of pseudo-code statements that represent part of the logical flow of the CORBA programming model for an authentication operation in a typical application program.

TABLE 1

```
// Step 1-1
// get SecurityCurrent object from ORB
current = orb.resolve_initial_references("SecurityCurrent");
// Step 1-2
// get Principal Authenticator object from SecurityCurrent object
pa = current.principal_authenticator( );
// Step 1-3
```

TABLE 1-continued

```
// authenticate user using Principal Authenticator object
cred = pa.authenticate(userid, password);
// Step 1-4
//set invocation credential on the current thread
current.set_credentials
 (org.omg.Security.CredentialType.SecInvocationCredentials, cred);
// Step 1-5
// execute a block of code . . .
Access remote object1;
Access remote object2;
Access remote object3;
```

As shown in Table 1, the objects in the CORBA security environment are used to authenticate a principal. The principal provides identity and authentication data, such as a password, to the client application. The client application uses the "Principal Authenticator" object to make the calls necessary to authenticate the principal.

More specifically, the credentials for the authenticated principal are associated with the security system's implementation of the "SecurityCurrent" object and are represented by a "Credentials" object. The "SecurityCurrent" object represents the current execution context at both the principal and target objects. The "SecurityCurrent" object represents service-specific state information associated with the current execution context. Both client and server applications have "SecurityCurrent" objects that represent the state associated with the thread of execution and the process in which the thread is executing. The "SecurityCurrent" object is a singleton object; there is only a single instance allowed in a process address space.

The "Principal Authenticator" object is used by a principal that requires authentication but has not been authenticated prior to calling the object system. The act of authenticating a principal results in the creation of a "Credentials" object that is made available as the default credentials for the application. The "Credentials" object provides methods to obtain and set the security attributes of the principals it represents. At any stage, a client application can determine the default credentials for subsequent invocations by calling a "get_credentials" method in the "SecurityCurrent" object and asking for the invocation credentials. These default credentials are used in all invocations that use object references.

Referring again to Table 1, Step 1-3 is a login step during which credentials are obtained; during step 1-4, the credentials that were obtained during step 1-3 are then set into the "SecurityCurrent" object. The "SecurityCurrent" object represents a particular thread's execution state. Hence, anything that is set to the "SecurityCurrent" object applies to all code that gets executed in that particular thread. When a block of code is executed during step 1-5, the block of code is executed under the identity of the principal that was established during step 1-3.

Turning from the CORBA programming model to the JAAS programming model, it is well-known that a goal of Java-related efforts is to provide a runtime environment that may be used by platform-independent applications with the intention of achieving a "write-once, run anywhere" methodology. Referring again to FIG. 1C, the Java methodology is illustrated with respect to security services; client application program 151 that has been developed in accordance with the JAAS programming model executes within a Java runtime environment (JVM 152) which, in turn, is supported within a client runtime environment that is executing an instance of the CORBA security service 155. As shown in the example of FIG. 1C, a platform-dependent implementation of JAAS may be integrated with a platform-dependent implementation of the CORBA security service, yet a client application that adheres to the JAAS programming model can operate in a platform-independent manner; by interfacing with JAAS through a set of standard JAAS APIs, the client application is not aware of the manner in which the specific instance of JAAS on the client device has been implemented, which may include support by an instance of the CORBA security service. The ability of JAAS to be supported on the CORBA security service is illustrated below.

JAAS contains a set of APIs that can be used to perform an authentication operation and to execute a block of code using the resulting credentials. Table 2 shows a set of pseudo-code statements that represent part of the logical flow of the JAAS programming model for an authentication operation in a typical Java application program.

TABLE 2

```
// Step 2-1
// create login context
LoginContext lc = new LoginContext("ClientCnfg", new
CallbackHandler( ));
// Step 2-2
// login/authenticate
lc.login( );
// Step 2-3
// get subject object
Subject mySubject = lc.getSubject( );
// Step 2-4
// execute a block of code using subject's credentials
Subject.doAs(mySubject, new PrivilegedAction( ) {
     . . .
     Access remote object1;
     Access remote object2;
     Access remote object3;
}); // doAs
```

The kind of proof required for authentication may depend on the security requirements of a particular resource and enterprise security policies. To provide such flexibility, the JAAS authentication framework is based on the concept of configurable authenticators. This architecture allows system administrators to configure, or plug in, the appropriate authenticators to meet the security requirements of the deployed application.

An important feature in JAAS is the mechanism by which an authenticated context is established. Ordinarily, authentication is not part of the normal Java method dispatch path. Thus, if a Java program wishes to request authentication, it constructs a "LoginContext" class object (step 2-1 in Table 2). To allow selection of an appropriate set of "LoginContext" objects, a "java.lang.String" object is passed to the "LoginContext" constructor. This string is used as an index into a configuration file, which selects the appropriate login module or modules to be used for authentication. The mechanism for providing additional configuration information is through an optional "CallbackHandler" object. When employed, these objects can provide implementation-specific and environment-specific information needed to satisfy a particular "LoginModule" object. For example, the callback handler may be passed to the underlying login modules so that they may communicate and interact with users, e.g., to prompt users for a username and password via a graphical user interface.

Once the application has instantiated a "LoginContext" object, it invokes the "login" method to authenticate a principle (step 2-2), thereby constructing and annotating a "Subject" class object with appropriate authenticated "Principal" and "Credential" class objects. This "login" method invokes the login methods from each of the underlying login modules that have been configured and selected for the application. Each underlying login module then performs its respective type of authentication, e.g., username/password or smart card pin verification. Assuming these authentication operations are successful, each underlying login module updates the "Subject" object with the relevant principals, i.e., authenticated identities, and credentials, e.g., authentication data such as cryptographic keys. This "Subject" object can then be returned via the "getSubject" method from the "LoginContext" class (step 2-3). When the program no longer needs the authenticated identities, it can simply call the "LoginContext" object's "logout" method.

Subsequently, to assume the identity of a particular subject, shown as "mySubject" in the example, the program calls the "Subject.doAs(mySubject,PrivilegedAction)" method (step 2-4), passing in the "Subject" object for the particular subject as a parameter, i.e., "mySubject". This method call runs the specified "PrivilegedAction" object's "run" method with the security attributes of the specified "Subject" class object. In the example that is shown in Table 2, the "PrivilegedAction" object is defined in-line; the block of code within the "PrivilegedAction" object is then executed in association with the credentials that are stored within the specified subject object. After the "PrivilegedAction" object's "run" method terminates, the program returns to the security state in effect prior to the "Subject.doAs()" call.

Similarities between the JAAS programming model and the CORBA security programming model are readily apparent with a brief comparison of the pseudo-code in Table 1 and in Table 2, which both show the manner in which an authentication operation creates credentials that are associated with a block of code or an execution thread. The details of interfacing JAAS operations with CORBA security service operations are well-known and are not further illustrated herein.

As noted previously, the JAAS programming model simplifies some aspects of incorporating authentication operations into an application, yet the JAAS programming model contains an inherent disadvantage. As illustrated in Table 2, the block of code that is controlled by the "Subject.doAs" method may access many objects, and access to a particular object may be restricted because it resides within a particular security domain. Successful access to an object will depend upon whether the "Subject" object holds a valid credential for the corresponding security domain. However, it is often not practical for an application to determine all of the objects that might be accessed and then prematurely gather the appropriate credentials.

In other words, before attempting to access any remote objects that are supported by servers within a given security domain, a client application would need to complete an authentication operation with respect to that given security domain. However, prior to executing the block of code that will access the remote objects, the client application may not have the identities of the security domains of the servers with which it will attempt to communicate, i.e., the security domains that are hosting the objects within the particular block of code. It is not practical for a developer of a client application to know the implementation details of the remote objects or to be able to program an application to dynamically obtain this information, such as the identity of a server that is hosting a remote object, the domain in which the object resides, or whether the object is protected. The present invention provides a method for obtaining and using this information dynamically such that authentication operations can occur in a timely fashion, as explained in more detail further below.

Figure 2:
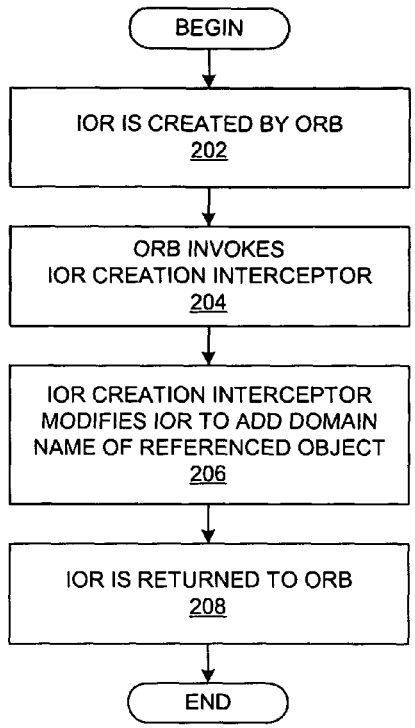
FIG. 2 depicts a flowchart that shows a process for extending an IOR to support additional functionality in accordance with an embodiment of the present invention.

With reference now to FIG. 2, a flowchart depicts a process for extending an IOR to support additional functionality in accordance with an embodiment of the present invention. The process begins with an ORB creating an IOR (step 202), after which the ORB invokes any interceptors that have been registered with the ORB to be invoked when an IOR is created (step 204). An ORB creates an IOR for each object that a server exports to a client, and in a well-known fashion, the ORB calls IOR creation interceptors for each object.

In a manner novel to the present invention, though, a special IOR creation interceptor modifies the IOR to add a domain name for the object that is referenced by the IOR (step 206). The format of an IOR may vary; hence, the format for an identifier of a security domain within an IOR or the manner in which that domain name is embedded within an IOR may also vary. It should also be noted that the embedded information that is added to the IOR may comprise any information that is required to determine the need for an authentication operation for a protected object, e.g., an identifier for a remote server that is hosting the referenced object. After the IOR has been modified, the IOR is returned to the ORB (step 208), and the process is concluded.

Figure 3:
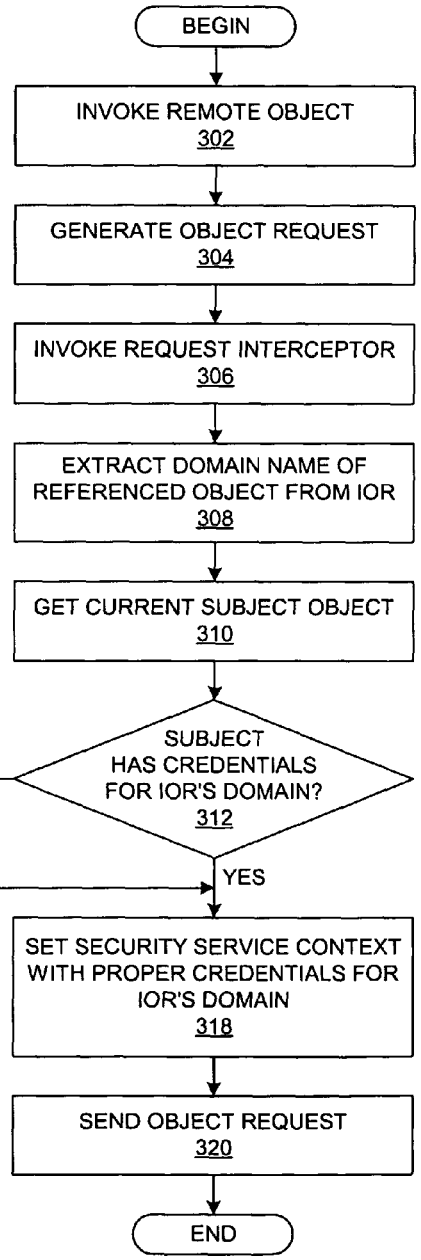
FIG. 3 depicts a flowchart that shows a process for exploiting an extended IOR to perform an authentication operation dynamically in accordance with an embodiment of the present invention.

With reference now to FIG. 3, a flowchart depicts a process for exploiting an extended IOR to dynamically perform an authentication operation in accordance with an embodiment of the present invention. The process commences with the invocation of a remote/target object by a requesting entity, such as a Java program (step 302). As discussed above with respect to FIG. 1E, a requesting entity, such as a Java program, may obtain an IOR for a remote target object that is invoked within the Java program.

In due course, an object request is generated (step 304), and the ORB invokes any registered request interceptors (step 306). When a request interceptor is invoked, it has access to the IOR that is the basis for the request. As discussed above with respect to FIG. 2, the IOR that is provided to the requesting entity may be extended in accordance with the present invention to include a domain name on which the target object is supported. Hence, the request interceptor extracts from the extended IOR an identifier for the security domain within which the referenced object is being supported (step 308). The request interceptor also has access to the current "Subject" object (or "SecurityCurrent" object) that may be associated with the current execution context, e.g., the current execution thread (step 310), and the request interceptor checks to see whether or not the current "Subject" object contains credentials for the security domain of the referenced object (step 312); the credentials would include an appropriate identifier for the scope of the credentials, such as an identifier for the security domain.

If the current "Subject" object does not contain credentials for the remote server's domain, then the request interceptor initiates an authentication operation to the referenced object's domain, i.e., the target object's domain (step 314). In a typical fashion, a request interceptor can determine the type of authentication operation that is supported by the target object by looking at the security tags in the IOR. With the present invention, the request interceptor also has accept to the target object's domain so that the request interceptor has adequate information for sending a request for an authentication operation. In a manner similar to that described above with respect to Table 2, the request interceptor may select an appropriate login module to be used for the authentication operation by referring to an appropriate execution context object; if the user needs to be prompted to enter a username and password, the login module's associated "CallbackHandler" object can also be obtained. Assuming that the authentication operation is successfully completed, then a new "Subject" object is returned, and the principal object and the credentials object from the new "Subject" object is added to the current "Subject" object (step 316).

In this manner, the current "Subject" object either contains credentials for the target object's domain when checked at step 312, or the current "Subject" object has been dynamically updated to include credentials for the target object's domain at step 316. Hence, the request interceptor has access to the proper credentials to invoke the target object within its security domain, and the request interceptor can set the proper credentials as appropriate for further CORBA-compliant processing (step 318), e.g., by attaching to the request message the security service context object in a well-known manner, which contains the authentication information. The object request is then sent to the target object's domain (step 320), and the dynamic authentication process is concluded.

The advantages of the present invention should be apparent in view of the detailed description that is provided above. A request-level interceptor is able to dynamically initiate an authentication operation to a security domain within which a remote object is hosted by extracting the security domain's identifier that has been placed in the remote object's IOR for that purpose. In so doing, a client application is not required to obtain the identity of the security domains of the remote objects that will be invoked during the execution of the client application.

It is important to note that while the present invention has been described in the context of a fully functioning data processing system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include media such as EPROM, ROM, tape, paper, floppy disc, hard disk drive, RAM, and CD-ROMs and transmission-type media, such as digital and analog communications links.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A method for performing an authentication operation, the method comprising:
    obtaining by a request-level interceptor an interoperable object reference (IOR) for a target object that has been invoked by an application;
    extracting from the IOR an identifier for a security domain that hosts the target object;
    in response to a determination that the application does not have an authentication credential for the security domain, initiating by the request-level interceptor an authentication operation with the security domain for the application;
    receiving an authentication credential for the application from the security domain; and
    placing the authentication credential into an execution context for the application by the request-level interceptor.

2. The method of claim 1 further comprising: invoking a target object by the application; generating an object request for the target object; and invoking the request-level interceptor.

3. The method of claim 1 further comprising:
    setting the authentication credential for the security domain for use with a CORBA-compliant (Common Object Request Broker Architecture) security service.

4. The method of claim 1 further comprising:
    interfacing the application with a Java Authentication and Authorization Service implementation.

5. The method of claim 4 wherein a step of determining whether the application has an authentication credential for the security domain further comprises:
    retrieving a Java class Subject object from the execution context for the application; and
    examining the Java class Subject object for an authentication credential for the security domain.

6. The method of claim 4 wherein the step of placing the authentication credential into the execution context for the application further comprises:
    adding the authentication credential and associated information into a Java class Subject object.

7. A computer program product in a tangible computer readable medium for performing an authentication operation in a data processing system, the computer program product comprising:
    means for obtaining by a request-level interceptor an interoperable object reference (IOR) for a target object that has been invoked by an application;
    means for extracting from the IOR an identifier for a security domain that hosts the target object; means for initiating by the request-level interceptor an authentication operation with the security domain for the application in response to a determination that the application does not have an authentication credential for the security domain;
    means for receiving an authentication credential for the application from the security domain; and
    means for placing the authentication credential into an execution context for the application by the request-level interceptor.

8. The computer program product of claim 7 further comprising:

means for invoking a target object by the application;
means for generating an object request for the target object; and means for invoking the request-level interceptor.

9. The computer program product of claim 7 further comprising:
means for selling the authentication credential for the security domain for use with a CORBA-compliant (Common Object Request Broker Architecture) security service.

10. The computer program product of claim 7 further comprising:
means for interfacing the application with a Java Authentication and Authorization Service implementation.

11. The computer program product of claim 10 wherein a means for determining whether the application has an authentication credential for the security domain further comprises:
means for retrieving a Java class Subject object from the execution context for the application; and
means for examining the Java class Subject object for an authentication credential for the security domain.

12. The computer program product of claim 10 wherein the means for placing the authentication credential into the execution context for the application further comprises:
means for adding the authentication credential and associated information into a Java class Subject object.

13. An apparatus for performing an authentication operation, the apparatus comprising:
means for obtaining by a request-level interceptor an interoperable object reference (IOR) for a target object that has been invoked by an application;
means for extracting from the IOR an identifier for a security domain that hosts the target object;
means for initiating by the request-level interceptor an authentication operation with the security domain for the application in response to a determination that the application does not have an authentication credential for the security domain;
means for receiving an authentication credential for the application from the security domain; and
means for placing the authentication credential into an execution context for the application by the request-level interceptor.

14. The apparatus of claim 13 further comprising:
means for invoking a target object by the application;
means for generating an object request for the target object; and
means for invoking the request-level interceptor.

15. The apparatus of claim 13 further comprising:
means for selling the authentication credential for the security domain for use with a CORBA-compliant (Common Object Request Broker Architecture) security service.

16. The apparatus of claim 13 further comprising:
means for interfacing the application with a Java Authentication and Authorization Service implementation.

17. The apparatus of claim 16 wherein a means for determining whether the application has an authentication credential for the security domain further comprises:
means for retrieving a Java class Subject object from the execution context for the application; and
means for examining the Java class Subject object for an authentication credential for the security domain.

18. The apparatus of claim 16 wherein the means for placing the authentication credential into the execution context for the application further comprises:
means for adding the authentication credential and associated information into a Java class Subject object.

* * * * *